United States Patent
Hogan et al.

(10) Patent No.: US 10,150,869 B2
(45) Date of Patent: Dec. 11, 2018

(54) METHOD FOR PRODUCING POLYMERIC COMPOSITIONS INCLUDING FUNCTIONALIZED POLYMERS

(71) Applicant: Firestone Polymers, LLC, Akron, OH (US)

(72) Inventors: Terrence E. Hogan, Uniontown, OH (US); Mark N. Dedecker, North Canton, OH (US); Jessica C. Kurasch, Fairlawn, OH (US); Gabrielle L. Mcintyre, Akron, OH (US); Karen Maglione, Wadsworth, OH (US); Christine M. Rademacher, Akron, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 15/103,433

(22) PCT Filed: Dec. 12, 2014

(86) PCT No.: PCT/US2014/069905
§ 371 (c)(1),
(2) Date: Jun. 10, 2016

(87) PCT Pub. No.: WO2015/089356
PCT Pub. Date: Jun. 18, 2015

(65) Prior Publication Data
US 2016/0312028 A1    Oct. 27, 2016

Related U.S. Application Data

(60) Provisional application No. 61/915,287, filed on Dec. 12, 2013.

(51) Int. Cl.
| | | |
|---|---|---|
| *C08L 83/10* | (2006.01) | |
| *C08F 8/42* | (2006.01) | |
| *C08F 36/04* | (2006.01) | |
| *C08C 19/25* | (2006.01) | |
| *C08C 19/44* | (2006.01) | |
| *C08G 77/442* | (2006.01) | |
| *C08L 19/00* | (2006.01) | |
| *C08L 53/00* | (2006.01) | |

(52) U.S. Cl.
CPC .............. *C08L 83/10* (2013.01); *C08C 19/25* (2013.01); *C08C 19/44* (2013.01); *C08F 8/42* (2013.01); *C08F 36/04* (2013.01); *C08G 77/442* (2013.01); *C08L 19/006* (2013.01); *C08L 53/00* (2013.01)

(58) Field of Classification Search
CPC ........ C08L 19/006; C08L 83/10; C08L 53/00; C08F 8/42; C08F 36/04; C08C 19/44; C08C 19/25; C08G 77/442
See application file for complete search history.

(56) References Cited

U.S. PATENT DOCUMENTS

| | | | |
|---|---|---|---|
| 5,659,056 A | | 8/1997 | Hergenrother et al. |
| 6,008,295 A | * | 12/1999 | Takeichi .............. B60C 1/0016 524/423 |
| 6,255,404 B1 | | 7/2001 | Hogan et al. |
| 6,279,632 B1 | | 8/2001 | Hogan et al. |
| 6,573,412 B1 | | 6/2003 | Hogan et al. |
| 2008/0015309 A1 | * | 1/2008 | Ozawa .................... B60C 1/00 524/588 |
| 2014/0031471 A1 | | 1/2014 | Rademacher et al. |

FOREIGN PATENT DOCUMENTS

| | | |
|---|---|---|
| EP | 1462459 A1 | 9/2004 |
| JP | 2011-057842 A | 3/2011 |

OTHER PUBLICATIONS

Hollender, C., International Search Report with Written Opinion from PCT/US2014/069905, 9 pages (dated Sep. 9, 2015).

Hogan, Terrence E. et al, "The Role of Functional Polymers in Improving Tire Performance," ACS Rubber Division Meeting, Presented at Rubber Division, American Chemical Society, Inc., Pittsburgh, PA, Paper 113, (Oct. 14, 2005).

* cited by examiner

*Primary Examiner* — Robert S Jones
(74) *Attorney, Agent, or Firm* — Meredith E. Hooker; Arthur M. Reginelli

(57) ABSTRACT

A method for producing a functionalized polymer, the method comprising the steps of polymerizing conjugated diene monomer, optionally together with a copolymerizable monomer, within a solvent to produce a polymerization mixture including a polymer having a reactive terminus, coupling a portion of the polymer having a reactive terminus with a hydrocarbyloxysiloxane to produce a polymerization mixture including polymer coupled with the hydrocarbyloxysiloxane and residual polymer having a reactive terminues, reacting the residual polymer having a reactive terminus with a functionalizing agent having at least one hydrocarbyloxy functionality to produce a polymerization mixture including a functionalized polymer and the polymer coupled with the hydrocarbyloxysiloxane, and desolventizing the polymerization mixture including the functionalized polymer and the polymer coupled with the hydrocarbyloxysiloxane.

13 Claims, No Drawings

METHOD FOR PRODUCING POLYMERIC COMPOSITIONS INCLUDING FUNCTIONALIZED POLYMERS

This application claims the priority of U.S. Provisional Application Ser. No. 61/915,287, filed on Dec. 12, 2013, which is incorporated herein by reference.

FIELD OF THE INVENTION

Embodiments of the present invention are directed toward a process for producing polymeric compositions including functionalized polymers. The polymeric compositions are synthesized under solution polymerization conditions, partially coupled and functionalized, and ultimately desolventized.

BACKGROUND OF THE INVENTION

It is common in the rubber industry, such as the tire industry, to reinforce rubber compositions with particulate filler. Among the advantages of doing so, the particulate filler can bolster the modulus of the rubber composition. For example, silica has advantageously been employed as a filler. The use of silica filler within tire treads produces, among other advantages, improved wear.

While fillers offer advantages in rubber compositions, the presence of the filler impacts the dynamic properties of the rubber compositions. Namely, hysteretic loss increases with filler concentration. This can be disadvantageous, especially in tire treads, because hysteretic loss is inversely proportional to rolling resistance.

It is known that polymers can be modified with certain functionalities that react or interact with filler and thereby reduce hysteretic loss. This reaction or interaction between the polymer functionality and the filler particle is believed to reduce polymer loose ends and disassociate filler agglomerates. For example, it is known to functionalize polymer chains with silicon-containing functionalities that react or interact with, or can be hydrolyzed to form functionalities that react or interact with, the silica filler. While these functionalities have proven useful in reducing hysteretic loss, the presence of these functionalities can present processing issues.

To begin with, by reacting the polymer with functional compounds designed to react or interact with filler, the ability to otherwise react the polymer can be sacrificed. For example, it may be desirable to couple polymer chains to build molecular weight in order to facilitate polymer isolation and/or handling. Once the polymer chains have been reacted with a functionalizing agent, however, the ability to react the polymer with a coupling agent is precluded.

Also, the presence of a silicon-containing functionality, such as an alkoxysilane functionality, which can hydrolyze into silanol functionalities, serve as locations where the polymer chains can couple, especially over time. While, as suggested above, polymer coupling can be advantageous for polymer isolation, long-term growth in polymer molecular weight, also known as Mooney growth, is not desirable. Indeed, long-term Mooney growth can frustrate future processing of the polymer, which takes place when, for example, the polymer is employed in the production of tires.

Attempts have been made to alleviate this Mooney growth. For example, U.S. Pat. No. 5,659,056 teaches the addition of a stabilizing agent that does not react with the polymer functionality but instead serves to neutralize the bi-product lithium compounds that may be present from polymer initiators. At neutral pH, the Mooney viscosity jump is less severe. Alternatively, U.S. Pat. No. 6,279,632 teaches a method for stabilizing Mooney viscosity growth by treating these polymers with long-chain alcohols. And, U.S. Pat. No. 6,255,404 teaches a method for stabilizing Mooney viscosity growth by treating polymers with silicon-containing functionalities with alkyl alkoxysilanes.

While the foregoing approaches have been useful, the silicon-containing functionalities on many useful polymers have a very high affinity to undergo hydrolysis reactions with water (i.e. hydrolyze), and therefore there is a need to develop a more aggressive means to stabilize the polymers from Mooney viscosity growth.

SUMMARY OF THE INVENTION

One or more embodiments of the present invention provide a method for producing a functionalized polymer, the method comprising the steps of polymerizing conjugated diene monomer, optionally together with a copolymerizable monomer, within a solvent to produce a polymerization mixture including a polymer having a reactive terminus, coupling a portion of the polymer having a reactive terminus with a hydrocarbyloxysiloxane to produce a polymerization mixture including polymer coupled with the hydrocarbyloxysiloxane and residual polymer having a reactive terminues, reacting the residual polymer having a reactive terminus with a functionalizing agent having at least one hydrocarbyloxy functionality to produce a polymerization mixture including a functionalized polymer and the polymer coupled with the hydrocarbyloxysiloxane, and desolventizing the polymerization mixture including the functionalized polymer and the polymer coupled with the hydrocarbyloxysiloxane.

One or more embodiments of the present invention provide a method for producing a polymeric composition, the method comprising the steps of partially coupling a reactive polymer batch with a hydrocarbyloxysiloxane and terminating reactive polymer remaining after said step of partially coupling with a functionalizing agent.

One or more embodiments of the present invention provide a polymeric composition comprising a polymer blend including polymer coupled with a hydrocarbyloxysiloxane and functionalized polymer.

DETAILED DESCRIPTION OF ILLUSTRATIVE EMBODIMENTS

Embodiments of the present invention are based, at least in part, on the discovery of a process for providing a polymeric composition including functionalized polymer. The polymeric composition includes coupled polymer and functionalized polymer. In one or more embodiments, polymers are synthesized under solution-polymerization conditions, partially coupled and functionalized, and subsequently desolventized. Coupling is advantageously accomplished using a hydrocarbyloxysiloxane, and it is believed that the degree of coupling combined with the type of coupling advantageously provides a composition that can be desolventized using commercially efficient techniques, provides a desolventized polymeric composition that does not demonstrate deleterious Mooney growth upon aging, and can be subsequently processed, including mixing with reinforcing filler, using commercially efficient techniques.

Preparation of Polymers

In one or more embodiments, the polymers are prepared by employing anionic polymerization techniques. The preparation of polymers by employing anionic polymerization techniques is generally known. In general, an anionic initiator is used to initiate the polymerization of monomer. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce reactive polymers (e.g. living polymers or polymers having a reactive terminus) that, prior to quenching, are capable of reacting with additional monomers for further chain growth or reacting with certain functionalizing agents to give functionalized polymers. As those skilled in the art appreciate, these reactive polymers include a reactive chain end, which is believed to be ionic, at which a reaction between a functionalizing agent and the tail end of the polymer can take place and thereby impart a functionality to the tail end of the polymer. Also, anionic polymerization techniques allow for the use of initiators containing a functionality that can be imparted to the head of the polymer.

The monomer that can be anionically polymerized to form these polymers include conjugated diene monomer, which may optionally be copolymerized with other monomers such as vinyl-substituted aromatic monomer. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinylnaphthalene. When preparing copolymers, such as those containing conjugated diene monomers and vinyl-substituted aromatic (e.g., polydiene copolymers) monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

The practice of this invention is not limited by the selection of any particular anionic initiators. In particular embodiments, the hydrolyzable functionality or group is imparted to the polymer by either the initiator or the functionalizing agent. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black filled vulcanizates prepared from polymers containing the functional group as compared to similar carbon-black filled vulcanizates prepared from polymer that does not include the functional group.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium compounds, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference. Additional examples include cyclic sulfur-containing or oxygen containing azaheterocycles such as disclosed in WO 2004/020475, U.S. Ser. No. 60/644,164 and U.S. Pat. No. 6,596,798, which are incorporated herein by reference. Other examples include boron-containing terminators such as disclosed in U.S. Ser. No. 60/591,065, which is incorporated herein by reference. Still other examples include cyclic siloxanes such as hexamethylcyclotrisiloxane, including those disclosed in U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in U.S. Ser. Nos. 60/624,347 and 60/643,653, which are incorporated herein by reference. In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference. In yet other embodiments, the head of the polymer is functionalized by initiating polymerization in the presence of a vinyl silane or vinyl silazane and an organolithium compound. These particular polymers may be referred to as silazane-intitiated polymers. Techniques for preparing silazane-initiated polymers are set forth in U.S. Publication Nos. 2010/0056713, 20100/056712, 2010/0056711, 2010/0056710, 2010/0056709, 2010/0056703, 2010/0016499, 2009/0247696, and 2009/0247692, which are incorporated herein by reference. In general, mono-, di, and tri-silazanes can be reacted with an alkyllithium, either in a preformation set or in situ, to form an initiator species.

Anionic polymerization may be conducted in polar solvents, non-polar solvents, and mixtures thereof. In one or more embodiments, a solvent may be employed as a carrier to either dissolve or suspend the initiator in order to facilitate the delivery of the initiator to the polymerization system. In other embodiments, monomer can be used as the carrier. In yet other embodiments, the initiator can be used in their neat state without any solvent. In one or more embodiments, the solvent content of the polymerization mixture may be more than 20% by weight, in other embodiments more than 50% by weight, and in still other embodiments more than 80% by weight based on the total weight of the polymerization mixture.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization. Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

Anionic polymerization may be conducted in the presence of a randomizer or vinyl modifier. As those skilled in the art appreciate, these compounds, which may serve a dual role, can assist in the randomizing comonomer throughout the polymer chain and/or modify the vinyl content of the mer units deriving from dienes. Compounds useful as randomizers include those having an oxygen or nitrogen heteroatom and a non-bonded pair of electrons. Examples include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N—N'-dimethylpiperazine, diazabicyclooctane, dimethyl ether, diethyl ether, tri-n-butylamine, and mixtures thereof. In other embodiments, potassium alkoxides can be used to randomize the styrene distribution.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.01 and 100 moles per mole of the anionic initiator.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Polymerization of conjugated diene monomer, optionally together with monomer copolymerizable with conjugated diene monomer, in the presence of an effective amount of initiator, produces a reactive polymer. The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In one or more embodiments, the amount of initiator employed may be expressed as the mmols of initiator per weight of monomer. In one or more embodiments, the initiator loading may be varied from about 0.05 to about 100 mmol, in other embodiments from about 0.1 to about 50 mmol, and in still other embodiments from about 0.2 to about 5 mmol of initiator per 100 gram of monomer.

Polymerization Procedures

The polymerization may be conducted in any conventional polymerization vessels known in the art. For example, the polymerization can be conducted in a conventional stirred-tank reactor. In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

In one or more embodiments, the polymerization may be conducted in solution, which refers to a system that includes at least 20 wt %, in other embodiments at least 40 wt %, in other embodiments at least 60 wt %, and in other embodiments at least 70 wt % solvent. The monomer and/or polymer product may be dissolved or suspended in the solvent. In other embodiments, the polymerization may be conducted in a bulk system, which is a system wherein the monomer generally serves as a solvent in which the polymer product is suspended or dissolved. In particular embodiments, the polymerization in conducted in less than 10 wt %, in other embodiment less than 5 wt %, and in other embodiments less than 3 wt % solvent.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Coupling Reaction

As discussed above, the reactive polymer is partially coupled by employing a hydrocarbyloxysiloxane. The skilled person understands that coupling refers to the linking of two or more reactive (e.g., living) polymer chains. In one or more embodiments, the coupling reactions according to the present invention provide coupled polymer where at least three polymer chains are linked by the coupling agent.

In one or more embodiments, the hydrocarbyloxysiloxane coupling agent may be defined by the formula

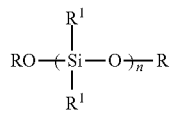

where each R and $R^1$ is independently a monovalent organic group and n is an integer from 1 to 50.

In one or more embodiments, the monovalent organic group may be a hydrocarbyl group or a hydrocarbyloxy group. In particular embodiments, each R is independently a hydrocarbyl group and each $R^1$ is independently a hydrocarbyloxy group. In these or other embodiments, each R is an alkyl group and each $R^1$ is an alkoxy group. In yet other embodiments, each R is an ethyl group, and each $R^1$ is an ethoxy group. In these or other embodiments, n may be at least 2, in other embodiments at least 3, in other embodiments at least 4, and in other embodiments at least 5. In these or other embodiments, n may be at most 25, in other embodiments at most 20, in other embodiments at most 15, in other embodiments at most 12, and in other embodiments at most 10. In one or more embodiments, n is from 2 to 12, in other embodiments from 3 to 10, and in other embodiments from 4 to 8.

In one or more embodiments, hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms. In one or more embodiments, the hydrocarbyl group is an ethyl group.

In one or more embodiments, hydrocarbyloxy groups include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. In one or more embodiments, the hydrocarbyloxy group is an ethoxy group.

In one or more embodiments, the hydrocarbyloxysiloxane may be defined by its functionality, which refers to the number of functional or reactive equivalents or reactive sites within the coupling agent. In one or more embodiments, the hydrocarbyloxysiloxane has a functionality of at least 3, in other embodiments at least 5, in other embodiments at least 7, and in other embodiments at least 9. In these or other embodiments, the functionality of the hydrocarbyloxysiloxane is at most 15, in other embodiments at most 13, and in other embodiments at most 11. In one or more embodiments, the functionality, as defined herein, refers to the average functionality of a composition including a plurality of hydrocarbyloxysiloxane coupling agent molecules.

In one or more embodiments, the amount of coupling agent employed in practice of the present invention may be defined with respect to the ultimate degree of coupling desired. The skilled person, without undue experimentation, can determine the amount of coupling agent that should be used to achieve a desired level of coupling. In one or more embodiments, the degree of coupling achieved by use of the hydrocarbyloxysiloxane coupling agent is at least 10%, in other embodiments at least 20%, in other embodiments at least 30%, in other embodiments at least 33%, in other embodiments at least 35%, and in other embodiments at least 37%, based upon the total number of reactive polymer molecules being treated with the coupling agent. In these or other embodiments, the desired degree of coupling is at most 80%, in other embodiments at most 60%, in other embodiments at most 50%, in other embodiments at most 47%, in other embodiments at most 45%, and in other embodiments at most 43%, based upon the total number of reactive polymer molecules being treated with the coupling agent. In these or other embodiments, the desired degree of coupling is from about 35 to about 40%, in other embodiments from about 36 to about 44%, and in other embodiments from about 37 to about 43%, based upon the total number of reactive polymer molecules being treated with the coupling agent.

While reference has been made to the functionality of the coupling agents employed in practice of the present invention, the skilled person recognizes that coupling efficiency will impact the ultimate degree of coupling that can be achieved by any given coupling agent. The coupling efficiency likewise impacts the molar or equivalent ratio of coupling agent to reactive polymer chains, the latter of which may also be referenced based upon the moles of initiator (e.g., lithium) charged to the system for purposes of synthesizing the polymer. In any event, reference may be made to the ratio of equivalents of functionality associated with the coupling agent to equivalents of lithium charged to the system for purposes of synthesizing the polymer. In one or more embodiments, the ratio of equivalents of functionality associated with the coupling agent to the equivalents of lithium may be at least 5:1, in other embodiments at least 7:1, and in other embodiments at least 9:1. In these or other embodiments, the ratio of equivalents of functionality associated with the coupling agent to the equivalents of lithium may be at most 15:1, in other embodiments at most 13:1, and in other embodiments at most 11:1. In these or other embodiments, the ratio of equivalents of functionality associated with the coupling agent to the equivalents of lithium is from about 5:1 to about 15:1, in other embodiments from about 7:1 to about 13:1, and in other embodiments from about 9:1 to about 11:1.

As the skilled person will readily recognize, the coupling of the reactive polymers takes place prior to quenching. Likewise, the coupling reaction takes place prior to isolation of the polymer molecules; i.e., prior to removal of the solvent. In one or more embodiments, the coupling reaction takes place prior to functionalization of the polymer. In other words, the coupling agent is introduced to the polymerization mixture prior to addition of a functionalizing agent. In other embodiments, coupling and functionalization occurs simultaneously. In other words, the coupling agent and the functionalizing agent may be added to the polymerization mixture simultaneously. In yet other embodiments, functionalization of the polymer takes place prior to coupling. In other words, the functionalizing agent may be added to the polymerization mixture prior to the coupling agent.

Terminal Functionalization

Practice of the present invention is not limited by the selection of any particular functionalizing agent. In one or more embodiments, the functionalizing agent imparts a hydrolyzable group to the terminal end of the polymer chain.

Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Other examples include trialkyltin halides such as tributyltin chloride, as disclosed in U.S. Pat. Nos. 4,519,431, 4,540,744, 4,603,722, 5,248,722, 5,349,024, 5,502,129, and 5,877,336, which are incorporated herein by reference. Still other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference.

In one or more embodiments, a silicon-containing functionalizing agent is employed. These terminating agents, which may also be referred to as a siloxane terminating agents or alkoxysilane terminating agents, may be defined by the formula

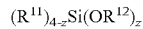

where $R^{11}$ is a halogen atom or a monovalent organic group, $R^{12}$ is a monovalent organic group, and z is an integer from 1 to 4. Halogens include chlorine, bromine, iodine, and fluorine. In one embodiment, the halogen includes chlorine. Techniques for preparing siloxane-terminated polymers are set forth in U.S. Pat. Nos. 3,244,664, 6,008,295, 6,228,908, and 4,185,042, which are incorporated herein by reference.

Suitable examples of siloxane terminating agents include tetraalkoxysilanes, alkylalkoxysilanes, arylalkoxysilanes, alkenylalkoxysilanes, and haloalkoxysilanes.

Examples of tetraalkoxysilane compounds include tetramethyl orthosilicate, tetraethyl orthosilicate, tetrapropyl orthosilicate, tetrabutyl orthosilicate, tetra(2-ethylhexyl)orthosilicate, tetraphenyl orthosilicate, tetratoluyloxysilane, and the like.

Examples of alkylalkoxysilane compounds include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), γ-methacryloxy propyl trimethoxysilane and the like.

Examples of arylalkoxysilane compounds include phenyltrimethoxysilane, phenyltriethoxysilane, phenyltri-n-propoxysilane, phenyltri-n-butoxysilane, phenyltriphenoxysilane, and the like.

Examples of alkenylalkoxysilane compounds include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, and the like.

Examples of haloalkoxysilane compounds include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

Other useful silanes include bis-(trimethoxysilane)-ether, 3-mercaptopropyltriethoxysilane, 3-mercaptopropyltrimethoxysilane, 3, 3'-bis(triethoxysilylpropyl)disulfide, Si-69(bis-(3-triethoxysilylpropyl)tetrasulfide) and the like.

In yet other embodiments, the polymers are terminated with imino group-containing alkoxysilane compounds as disclosed in U.S. Publ. Nos. 2005/0009979, 2010/0113683, and 2011/0092633, which are incorporated herein by reference.

In one or more embodiments, the imino group-containing alkoxysilane functionalizing agent may be defined by the formula

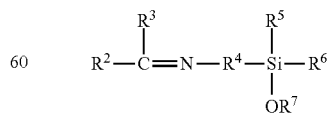

where $R^2$, $R^3$, and $R^7$ are monovalent organic groups, where $R^4$ is a divalent organic group, and where $R^5$ and $R^6$ are each independently hydrocarbyloxy groups or hydrocarbyl groups.

Examples of these imino group-containing alkoxysilane compounds include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)1-propaneamine, trimethoxysilyl compounds, methyldiethoxysilyl compounds, ethyldiethoxysilyl compounds, methyldimethoxysilyl compounds and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, and N-(3-methyldiethoxysilylpropyl)-4,5-dihydroimidazole.

In one or more embodiments, the amount of functionalizing agent employed to prepare the functionalized polymers is best described with respect to the equivalents of lithium or metal cation associated with the initiator. For example, the moles of functionalizing agent per mole of lithium may be about 0.1 to about 10, in other embodiments about 0.2 to about 2, in other embodiments about 0.3 to about 3, in other embodiments from about 0.6 to about 1.5, in other embodiments from about 0.7 to about 1.3, in other embodiments from about 0.8 to about 1.1, and in other embodiments from about 0.9 to about 1.0. The skilled person will recognize that where the functionalizing agent is added after the coupling agent, some of the reactive polymer chain ends that would otherwise be available for functionalization will have been consumed by the coupling reaction. In those embodiments where the coupling agent is added prior to the functionalizing agent, an excess of functionalizing agent is added. In other words, more equivalents of functionalizing agent are added relative to the reactive chain ends available after coupling.

In one or more embodiments, the amount of functionalizing agent employed can be described with reference to the amount of polymer to be functionalized. In one or more embodiments, the degree of functionalization is at least 10%, in other embodiments at least 20%, in other embodiments at least 30%, in other embodiments at least 33%, in other embodiments at least 35%, and in other embodiments at least 37%, based upon the total number of reactive polymer molecules being treated with the functionalizing agent. In these or other embodiments, the desired degree of functionalization is at most 80%, in other embodiments at most 60%, in other embodiments at most 50%, in other embodiments at most 47%, in other embodiments at most 45%, and in other embodiments at most 43%, based upon the total number of reactive polymer molecules being treated with the functionalizing agent. In these or other embodiments, the desired degree of functionalization is from about 35 to about 40%, in other embodiments from about 36 to about 44%, and in other embodiments from about 37 to about 43%, based upon the total number of reactive polymer molecules being treated with the functionalizing agent.

In one or more embodiments, the functionalizing agent is introduced to the polymerization mixture after the coupling agent, before the introduction of an optional quenching agent, and before polymer isolation.

In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

Quenching

In one or more embodiments, after coupling and/or functionalization has been accomplished or completed, a quenching agent can be added to the polymerization mixture in order to inactivate any residual reactive polymer chains and/or initiator residue. In one or more embodiments, he addition of a quenching agent is optional, and therefore in one or more embodiments, a quenching agent is not introduced to the polymerization mixture. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

Stabilization

In one or more embodiments, the polymeric compositions produced according to the present invention may be stabilized. In one or more embodiments, stabilization refers to the addition of one or more stabilizing agents to the polymerization mixture that are believed to inhibit Mooney growth that may take place after polymer isolation or upon aging. Stabilization techniques and stabilizing agents are known in the art as described in International Publication Nos. WO/2012/092626, WO/2013/184861, WO/2013/184783, WO/2013/184756, and WO/2013/184813, as well as U.S. Publication No. 2013/0331520, which are incorporated herein by reference.

In one or more embodiments, the stabilizing agent is introduced to the polymerization mixture after the coupling reaction has taken place (i.e., after introduction of the coupling agent) and after functionalization of the remaining polymer has taken place (i.e., after introduction of the functionalizing agent). In certain embodiments, the stabilizing agent is added after the addition of an optional quenching agent. In one or more embodiments, the stabilizing agent is added before polymer isolation.

In one or more embodiments, the stabilizing agent may be defined by the formula

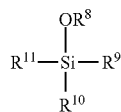

where $R^8$ is a hydrocarbyl group, $R^9$, $R^{10}$, and $R^{11}$ are each independently a hydrocarbyl group or a hydrocarbyloxy group.

In one or more embodiments, the stabilizing agent may be defined by the formula

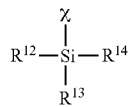

where $\chi$ is a hydrolyzable group that forms an acidic species upon hydrolysis, where $R^{12}$, $R^{13}$, and $R^{14}$ are each independently a halogen atom, a hydrocarbyl group, a hydrocarboxylate group, or a hydrocarbyloxy group.

In one or more embodiments, $\chi$ may include a halogen atom. In other embodiments, $\chi$ may include a hydrocarboxylate group, which may also be referred to as a hydrocarbonate group.

In one or more embodiments, hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms. In one or more embodiments, the hydrocarbyl group is an ethyl group.

In one or more embodiments, hydrocarbyloxy groups include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. In one or more embodiments, the hydrocarbyloxy group is an ethoxy group.

In one or more embodiments, hydrocarboxylate groups, which may also be referred to as hydrocarbonate groups, include, but are not limited to, alkanoate, cycloalkanoate, substituted cycloalkanoate, alkenoate, cycloalkenoate, substituted cycloalkenoate, aranoate, alloate, substituted aranoate, aralkanoate, alkaranoate, or alkynanoate groups.

In one or more embodiments, the halogen atoms may be selected from bromine, chlorine, and iodine.

In particular embodiments, $R^{12}$ is a halogen atom. In these or other embodiments, both $R^{12}$ and $R^{13}$ are halogen atoms. In these or other embodiments, each of $R^{12}$, $R^{13}$, and $R^{14}$ are halogen atoms. In particular embodiments, $\chi$, $R^{12}$, $R^{13}$, and $R^{14}$ are each halogen atoms such as chlorine atoms. In other embodiments, the $\chi$ is a halogen atom, and each of $R^{12}$, $R^{13}$, and $R^{14}$ is a hydrocarbyl group. In yet other embodiments, $R^{12}$ is a halogen atoms, and each of $R^{13}$ and $R^{14}$ are hydrocarbyl groups.

In one or more embodiments, types of stabilizing agents that may be employed in practicing the present invention include silyl halides and silyl esters.

In one or more embodiments, the stabilizing agent may include a trialkylsilanol, triarylsilanol, and/or diarylsilanediol. In one or more embodiments, the stabilizing agent is a triphenylsilanol.

In one or more embodiments, the stabilizing agent may be defined by the formula

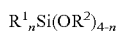

wherein each $R^1$ is selected from the group consisting of $C_1$ to $C_{20}$ alkyl, $C_4$ to $C_{10}$ cycloalkyl, or $C_5$ to $C_{20}$ aromatic groups, wherein each $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3. Examples of stabilizing agents include low molecular weight alkyl alkoxysilanes selected from the group consisting of diaryl dialkoxysilanes, i.e., those alkyl alkoxysilanes where n=2 in the structural formula set forth hereinabove, for example, diphenydiethoxysilane or diphenyldimethoxysilane.

In one or more embodiments, the amount of stabilizing agent employed may be at least 0.2, in other embodiments at least 0.4, in other embodiments at least 0.8, in other embodiments at least 1.0, and in other embodiments at least 1.1 moles of stabilizing agent per mole of polymer to be treated (which is equivalent to, for example, the moles of lithium employed in synthesizing the polymer). In these or other embodiments, the amount of stabilizing agent employed may be at most 5.0, in other embodiments at most 1.5, in other embodiments at most 1.3, and in other embodiments at most 1.2 moles of stabilizing agent per mole of polymer to be treated. In one or more embodiments, the amount of stabilizing agent employed may be from about 0.8 to about 1.5, in other embodiments from about 1.0 to about 1.3, and in other embodiments from about 1.1 to about 1.2 moles of stabilizing per mole of polymer to be treated.

In one or more embodiments, the polymer cement treated with the stabilizing agents according to practice of this invention is substantially devoid of living polymer, which refers to that amount of living polymer of less that will have an appreciable impact on the stabilization and/or neutralization of the polymer or polymer cement. In other words, the polymer cement is substantially non-living. As those skilled in the art appreciate, non-living polymer includes that polymer incapable of adding additional monomer. As discussed above, living polymer is capable of adding additional monomer to its reactive chain end. In one or more embodiments, the polymer cement includes less than 10%, in other embodiments less than 5%, in other embodiments less than 2%, in other embodiments less than 1%, and in other embodiments less than 0.5%, based on the total moles of polymer chain, of living polymer. In particular embodiments, the polymer cement is devoid of living polymer.

In one or more embodiments, practice of the present invention includes a sequential addition of the stabilizing agent after functional termination, coupling, and/or quenching of the polymer. For example, in one or more embodiments, a living polymer cement may be partially coupled, partially terminated with functional terminator, and then quenched with a protic compound such as an alcohol. Following this sequence, the stabilizing agent may be added to the polymer cement to treat the polymer that is substantially non-living.

Polymer Extender

In one or more embodiments, an extender can be added to the polymerization mixture prior to polymer isolation. In these or other embodiments, the extender is added after the coupling agent after the functionalizing agent, and after the stabilizing agent. For example, the polymerization mixture can be oil extended by adding an oil to the polymer, which may be in the form of polymer cement or polymer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Polymer Additives

In one or more embodiments, polymer additives may be added to the polymerization mixture prior to polymer isolation. In these or other embodiments, the polymer additive is added after the coupling agent, after the functionalizing agent, and after the stabilizing agent. For example, an antioxidant such as 2,6-di-tert-butyl-4-methylphenol may be added along with, before, or after the addition of the optional quenching agent. The amount of the antioxidant employed may be in the range of 0.2% to 1% by weight of the polymer product.

Polymer Isolation

In one or more embodiments, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer. In one or more embodiments, after formation of the polymer, a processing aid and other optional additives such as oil can be added to the polymer cement. The polymer and other optional ingredients may then be isolated from the solvent and optionally dried. Conventional procedures for desolventization and drying may be employed. In one embodiment, the polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

In one or more embodiments, after the introduction of the functionalizing agent to the reactive polymer, optionally after the addition of a quenching agent and/or antioxidant, and optionally after recovery or isolation of the functionalized polymer, a condensation accelerator can be added to the polymerization mixture. Useful condensation accelerators include tin and/or titanium carboxylates and tin and/or titanium alkoxides. One specific example is titanium 2-ethylhexyl oxide. Useful condensation catalysts and their use are disclosed in U.S. Publication No. 2005/0159554A1, which is incorporated herein by reference.

In one or more embodiments, after the reaction between the reactive polymer and the functionalizing agent has been accomplished or completed, optionally after the addition of a quenching agent and/or condensation catalyst, and optionally after recovery or isolation of the functionalized polymer, further reactions may be carried out with the functionalized polymer. For example, the functionalized polymer product can be treated with an alcohol, optionally in the presence of appropriate catalysts, which is believed to effect the formation of hydrocarbyloxy groups in lieu of hydroxy groups or halogen atoms that may be associated with the functional group of the polymer. In these or other embodiments, the functionalized polymers resulting from practice of the present invention can be exposed to or treated with water, optionally in the presence of a catalyst, in order to cleave or replace any hydrolyzable protecting groups that may be present or associated with the functional group of the polymer. Strong acid catalysts, such as those described herein, may be used for this purpose.

Characteristics of Polymeric Composition

In one or more embodiments, the polymeric compositions prepared according to the present invention are characterized by a sufficient Mooney viscosity that will permit efficient desolventization of the polymer using conventional steam disolventization techniques. In one or more embodiments, the Mooney viscosity ($ML_{1+4}$@100° C.) of the polymer at the step of desolventization is at least 40, in other embodiments at least 45, and in other embodiments at least 50. In these or other embodiments, the Mooney viscosity ($ML_{1+4}$@100° C.) of the polymer at the step of desolventization is less than 100, in other embodiments less than 95, in other embodiments less than 90, and in other embodiments less than 85.

In one or more embodiments, the polymeric compositions prepared according to the present invention are characterized by an advantageous aged Mooney viscosity. As a result, the aged polymers of the present invention can be efficiently processed, which includes mixing with reinforcing filler, using efficient mixing techniques. In one or more embodiments, the polymeric compositions of the present invention exhibit an aged Mooney ($ML_{1+4}$@100° C. after aging at 100° C. for 2 days at 2% humidity) of less than 110, in other embodiments less than 105, in other embodiments less than 100, and in other embodiments less than 95.

In one or more embodiments, the polymeric compositions are characterized by a Mooney viscosity growth of less than 30, in other embodiments less than 20, and in other embodiments less than 15 over a time span of up to 2 years.

Industrial Applicability

The polymeric compositions of this invention are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973).

The rubber compositions can be prepared by using the polymeric composition of this invention alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer and silica in the substantial absence of coupling agents and shielding agents.

The rubber compositions prepared from the polymers of this invention are particularly useful for forming tire components such as treads, subtreads, sidewalls, body ply skims, bead filler, and the like. In one or more embodiments, these tread or sidewall formulations may include from about 10% to about 100% by weight, in other embodiments from about 35% to about 90% by weight, and in other embodiments from about 50% to about 80% by weight of the polymer of this invention based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A method for producing a functionalized polymer, the method comprising the steps of:
   i. polymerizing conjugated diene monomer, optionally together with a copolymerizable monomer, within a solvent to produce a polymerization mixture including a polymer having a reactive terminus;
   ii. coupling a portion of the polymer having a reactive terminus with a hydrocarbyloxysiloxane to produce a polymerization mixture including polymer coupled with the hydrocarbyloxysiloxane and residual polymer having a reactive terminus, where the hydrocarbyloxysiloxane is defined by the formula:

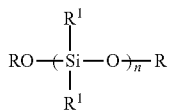

where each R and $R^1$ is independently a monovalent organic group and n is an integer of from 4 to 50, where the hydrocarbyloxysiloxane is employed in an amount that achieves from 30% to 50% coupling of the polymer having a reactive terminus;
   iii. reacting the residual polymer having a reactive terminus with a functionalizing agent having at least one hydrocarbyloxy functionality to produce a polymerization mixture including a functionalized polymer and the polymer coupled with the hydrocarbyloxysiloxane, where the functionalizing agent is employed in an amount that achieves from 30% to 80% functionalization of the residual polymer having a reactive terminus; and
   iv. desolventizing the polymerization mixture including the functionalized polymer and the polymer coupled with the hydrocarbyloxysiloxane.

2. The method of claim 1, where the process further includes a step of quenching prior to said step of desolventizing.

3. The method of claim 1, further comprising the step of adding a stabilizing agent to the polymerization mixture after said step of reacting.

4. The method of claim 1, where the functionalizing agent is defined by the formula:

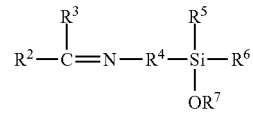

where $R^2$, $R^3$, and $R^7$ are monovalent organic groups, where $R^4$ is a divalent organic group, and where $R^5$ and $R^6$ are each independently hydrocarbyloxy groups or hydrocarbyl groups.

5. The method of claim 3, where the stabilizing agent is defined by the formula:

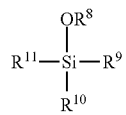

where $R^8$ is a hydrocarbyl group, $R^9$, $R^{10}$, and $R^{11}$ are each independently a hydrocarbyl group or a hydrocarbyloxy group.

6. The method of claim 1, where said step of polymerizing includes polymerizing the conjugated diene monomer, and optional comonomer, with an organolithium initiator.

7. The method of claim 6, where the molar ratio of the functionalizing agent to the lithium is from 0.1 to 10.

8. A method for producing a functionalized polymer, the method comprising the steps of:
   i. polymerizing conjugated diene monomer, optionally together with a copolymerizable monomer, within a solvent to produce a polymerization mixture including a polymer having a reactive terminus;
   ii. coupling a portion of the polymer having a reactive terminus with a hydrocarbyloxysiloxane to produce a polymerization mixture including polymer coupled with the hydrocarbyloxysiloxane and residual polymer having a reactive terminus;
   iii. reacting the residual polymer having a reactive terminus with a functionalizing agent having at least one hydrocarbyloxy functionality to produce a polymerization mixture including a functionalized polymer and the polymer coupled with the hydrocarbyloxysiloxane; and
   iv. desolventizing the polymerization mixture including the functionalized polymer and the polymer coupled with the hydrocarbyloxysiloxane, where said step of reacting the residual polymer having a reactive terminus with a functionalizing agent includes reacting from 20 to 90 molar percent of polymer having a reactive terminus produced in said step of polymerizing with the functionalizing agent.

9. The method of claim 8, where said step of coupling at least a portion of the residual polymer having a reactive terminus with an hydrocarbyloxysiloxane includes coupling from 10 to 80 molar percent of polymer having a reactive terminus produced in said step of polymerizing with the hydrocarbyloxysiloxane.

10. A method for producing a polymeric composition, the method comprising the steps of:

i. partially coupling a reactive polymer batch with a hydrocarbyloxysiloxane, where the hydrocarbyloxysiloxane is defined by the formula:

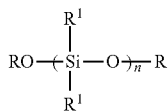

where each R and $R^1$ is independently a monovalent organic group and n is an integer of from 4 to 50, where the hydrocarbyloxysiloxane is employed in an amount that achieves from 30% to 50% coupling of the reactive polymer batch; and ii. terminating reactive polymer remaining after said step of partially coupling with a functionalizing agent, where the functionalizing agent is employed in an amount that achieves from 30% to 80% functionalization of the reactive polymer remaining after said step of partially coupling.

11. A polymeric composition comprising:
a polymer blend including from 30% to 50% polymer coupled with a hydrocarbyloxysiloxane and from 30% to 50% functionalized polymer, where the hydrocarbyloxysiloxane is defined by the formula:

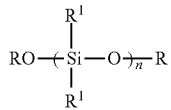

where each R and R1 is independently a monovalent organic group and n is an integer of from 4 to 50.

12. The polymer blend of claim 11, wherein each R is an alkyl group.

13. The polymer blend of claim 12, wherein each R is an ethyl group.

* * * * *